United States Patent
Kim

(10) Patent No.: US 9,589,529 B2
(45) Date of Patent: Mar. 7, 2017

(54) DEVICE EQUIPPED WITH FLEXIBLE DISPLAY AND CONTROLLING METHOD THEREOF

(71) Applicant: LG ELECTRONICS INC., Seoul (KR)

(72) Inventor: Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 13/801,237

(22) Filed: Mar. 13, 2013

(65) Prior Publication Data

US 2014/0218375 A1 Aug. 7, 2014

(30) Foreign Application Priority Data

Feb. 5, 2013 (KR) .................. 10-2013-0013051

(51) Int. Cl.
G09G 5/00 (2006.01)
G06F 3/048 (2013.01)
G06F 3/147 (2006.01)

(52) U.S. Cl.
CPC ............... G09G 5/00 (2013.01); G06F 3/048 (2013.01); G06F 3/147 (2013.01); G09G 2340/04 (2013.01); G09G 2380/02 (2013.01)

(58) Field of Classification Search
None
See application file for complete search history.

(56) References Cited

U.S. PATENT DOCUMENTS

| 2010/0056223 | A1 | 3/2010 | Choi et al. |
| 2010/0117975 | A1* | 5/2010 | Cho .................. G06F 1/1626 345/173 |
| 2011/0176260 | A1 | 7/2011 | Walters et al. |
| 2012/0038613 | A1 | 2/2012 | Choi |
| 2012/0092363 | A1 | 4/2012 | Kim et al. |
| 2012/0212433 | A1 | 8/2012 | Lee et al. |
| 2014/0015743 | A1* | 1/2014 | Seo et al. .................. 345/156 |

FOREIGN PATENT DOCUMENTS

| EP | 1970886 A1 | 9/2008 |
| EP | 2192750 A2 | 6/2010 |
| KR | 10-2010-0027502 A | 3/2010 |

OTHER PUBLICATIONS

Aug. 3, 2016, search report corresponding European application EP13874618 (7 pp).*

* cited by examiner

Primary Examiner — Barry Drennan
Assistant Examiner — Richard M Russell
(74) Attorney, Agent, or Firm — Birch, Stewart, Kolasch & Birch, LLP

(57) ABSTRACT

A device enabling for a user to control a flexible display more convenient and precise and a controlling method therefor, are discussed. According to one embodiment disclosed for this, the device includes a flexible display, a length measuring unit configured to measure an expanded length of the flexible display expanded from the device, a speed measuring unit configured to measure a speed of which the flexible display expanded from the device and a processor configured to control the flexible display, the length measuring unit, and the speed measuring unit, wherein if the flexible display is expanded to a unit length, the processor displays an application execution screen corresponding to the unit length in the flexible display.

15 Claims, 15 Drawing Sheets

| SPEED AT BEGINNING MOMENT OF EXPANSION | APPLICATION DISPLAY |
|---|---|
| SLOWER THAN DESIGNATED SPEED (THRESHOLD) | FIRST APPLICATION EXECUTION SCREEN DISPLAY |
| FASTER THAN DESIGNATED SPEED (THRESHOLD) | SECOND APPLICATION EXECUTION SCREEN DISPLAY |

| SPEED AT BEGINNING MOMENT OF EXPANSION | APPLICATION DISPLAY |
|---|---|
| SLOWER THAN DESIGNATED SPEED (THRESHOLD) | FIRST APPLICATION EXECUTION SCREEN DISPLAY |
| FASTER THAN DESIGNATED SPEED (THRESHOLD) | SECOND APPLICATION EXECUTION SCREEN DISPLAY |

FIG. 8A

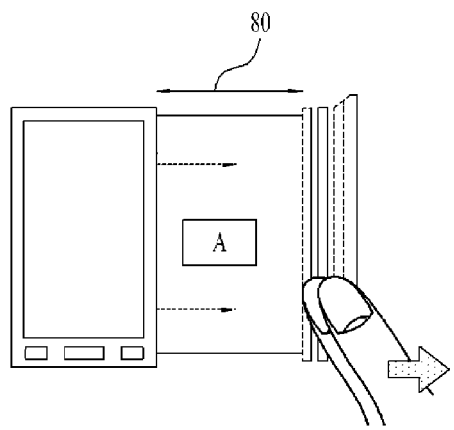

| SPEED AT FIRST UNIT LENGTH | IN CASE OF DISPLAYING FIRST APPLICATION | IN CASE OF DISPLAYING SECOND APPLICATION |
|---|---|---|
| SLOWER THAN DESIGNATED SPEED (THRESHOLD) | DISPLAY FIRST APPLICATION EXECUTION SCREEN IN A MANNER OF ENLARGING | DISPLAY SECOND APPLICATION EXECUTION SCREEN |
| FASTER THAN DESIGNATED SPEED (THRESHOLD) | DISPLAY SECOND APPLICATION EXECUTION SCREEN | |
| IN CASE THAT SPEED IS '0' | DISPLAY FIRST APPLICATION EXECUTION SCREEN | |

FIG. 9A

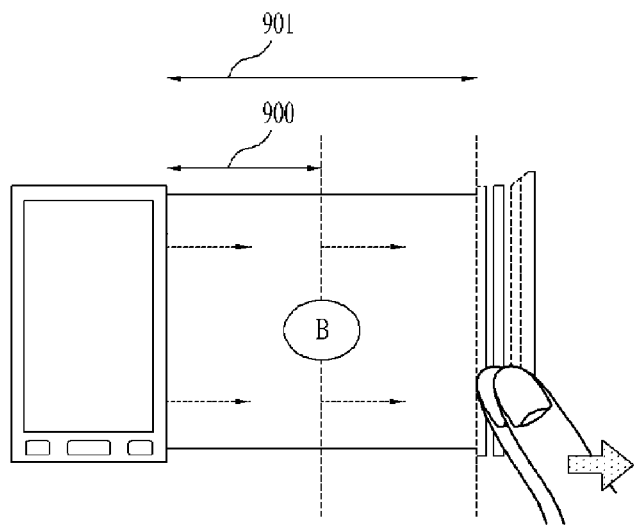

| SPEED AT FIRST UNIT LENGTH | IN CASE OF DISPLAYING FIRST APPLICATION | IN CASE OF DISPLAYING SECOND APPLICATION |
|---|---|---|
| FASTER THAN DESIGNATED SPEED (THRESHOLD) | DISPLAY THIRD APPLICATION EXECUTION SCREEN | DISPLAY THIRD APPLICATION EXECUTION SCREEN |
| SLOWER THAN DESIGNATED SPEED (THRESHOLD) | DISPLAY FIRST APPLICATION EXECUTION SCREEN IN A MANNER OF ENLARGING | DISPLAY SECOND APPLICATION EXECUTION SCREEN IN A MANNER OF ENLARGING |
| IN CASE THAT SPEED IS '0' | DISPLAY SECOND APPLICATION EXECUTION SCREEN | |

| REDUCTION SPEED AT EACH UNIT LENGTH | APPLICATION DISPLAY |
|---|---|
| FASTER THAN DESIGNATED SPEED (THRESHOLD) | DISPLAY APPLICATION EXECUTION SCREEN CORRESPONDING TO PREVIOUS UNIT LENGTH |
| SLOWER THAN DESIGNATED SPEED (THRESHOLD) | DISPLAY CURRENTLY EXECUTED APPLICATION EXECUTION SCREEN IN A MANNER OF REDUCING |

DEVICE EQUIPPED WITH FLEXIBLE DISPLAY AND CONTROLLING METHOD THEREOF

Pursuant to 35 U.S.C. §119(a), this application claims the benefit of the Korean Patent Application No. 10-2013-0013051, filed on Feb. 5, 2013, which is hereby incorporated by reference as if fully set forth herein.

BACKGROUND OF THE INVENTION

Field of the Invention

The present specification relates to a device and a controlling method thereof, and more particularly, to a device equipped with a flexible display. More specifically, the present specification relates to a device measuring an expansion speed of the flexible display and controlling an application execution screen displayed on the flexible display according to the measured expansion speed and method thereof.

Discussion of the Related Art

In terms of using an electronic device by a user, mobility has been a significant issue all the time. In particular, various electronic devices possessing a performance corresponding to a desktop computer as well as a cellular phone are on sale recently. Since these electronic devices decreased in size and weight, it enabled the user to use various electronic information while on the move.

In case of these devices, they enabled various functions to be performed in addition to such a basic function as a conventional data transmission/reception. Hence, a user should able to control the devices more conveniently and precisely. In particular, in case of recent devices, as a flexible display panel is introduced, an expansion of a display is enabled according to the use of the flexible display panel. Therefore, it is necessary to provide a control method for user convenience according to the expansion of the display.

SUMMARY OF THE INVENTION

Accordingly, the present specification is directed to a device and controlling method thereof that substantially obviate one or more problems due to limitations and disadvantages of the related art.

An object of the present specification is to provide a device, which controls execution of application according to expansion length of a flexible display, and a controlling method therefor.

Another object of the present specification is to provide a device, which selects a first application execution screen displayed on a flexible display according to the expansion speed of a beginning moment of the expansion of the flexible display, and a controlling method therefor.

Another object of the present specification is to provide a device, which controls an application execution screen displayed currently or displays in a manner of selecting an application corresponding to a next unit length according to an instantaneous speed of a timing point on which the flexible display expanded to each unit length in case that a flexible display expands more than each unit length.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present specification, as embodied and broadly described, according to one embodiment a device includes a flexible display, if the flexible display expands, a length measuring unit configured to measure length of the flexible display expanded from the device, a speed measuring unit configured to measure a speed of which the flexible display expands from the device and a processor configured to control the flexible display, the length measuring unit, and the speed measuring unit, wherein if the flexible display expands to a plurality of a unit length, the processor displays a plurality of an application execution screen corresponding to the plurality of the unit length on the flexible display, and wherein if the flexible display expands more than a first unit length, the processor controls a first application execution screen corresponding to the first unit length or controls a second application execution screen corresponding to a second unit length according to an expansion speed of the flexible display, and the second unit length being more than a length of the first unit length.

To achieve these and other advantages and in accordance with the purpose of the present specification, as embodied and broadly described, according to one embodiment a device includes a flexible display, a length measuring unit configured to measure a length of the flexible display expanded from the device, a speed measuring unit configured to measure a speed at which the flexible display is reduced to the device and a processor configured to control the flexible display, the length measuring unit, and the speed measuring unit, wherein if the flexible display is reduced to a unit length, the processor displays a plurality of an application execution screen corresponding to the plurality of the unit length on the flexible display and wherein if the flexible display is reduced to less than a first unit length, the processor controls a first application execution screen corresponding to the first unit length or controls a second application execution screen corresponding to a second unit length according to a reduction speed of the flexible display, and the second unit length being less than a length of the first unit length.

To further achieve these and other advantages and in accordance with the purpose of the present specification, according to one embodiment a method of controlling a device containing a main display, a flexible display, and a housing unit for storing the flexible display includes the steps of expanding the flexible display from the device, measuring a first expansion speed of the flexible display, displaying an application execution screen on the flexible display according to the measured first expansion speed, if the flexible display expands more than a first unit length, measuring a second expansion speed of flexible display and an expanded length, and controlling a first application execution screen corresponding to the first unit length or a second application execution screen corresponding to second unit next unit length of the unit length according to the measured expansion speed and the expanded length.

Accordingly, the present specification provides the following effects and/or advantages.

According to one embodiment, since the execution of an application is controlled in accordance with an expansion length of a flexible display, a user may be able to simply control the execution of the application in a manner of expanding/reducing the flexible display without such a separate user input as an icon selection and the like.

According to a different embodiment, in case that a flexible display expands to a unit length, since an application corresponding to each unit length is executed, a user may be able to intuitively know the width of execution screen of the application.

According to a different embodiment, since a display of an application is controlled according to an expansion speed of the flexible display, a user may be able to more conveniently control the display of the application in a manner of adjusting the expansion speed.

According to a different embodiment, in case that a user expands the flexible display faster than a designated speed, a device displays an application corresponding to a next unit length in advance, thereby 1) preventing a waste of energy resulted from displaying unnecessary information and 2) providing the information required by a user immediately.

According to a different embodiment, in case that a user expands the flexible display slower than a designated speed, a device displays the application execution screen currently displayed in the flexible display in a manner of enlarging, thereby providing a more intuitive user interface and expanding the application execution screen more conveniently.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
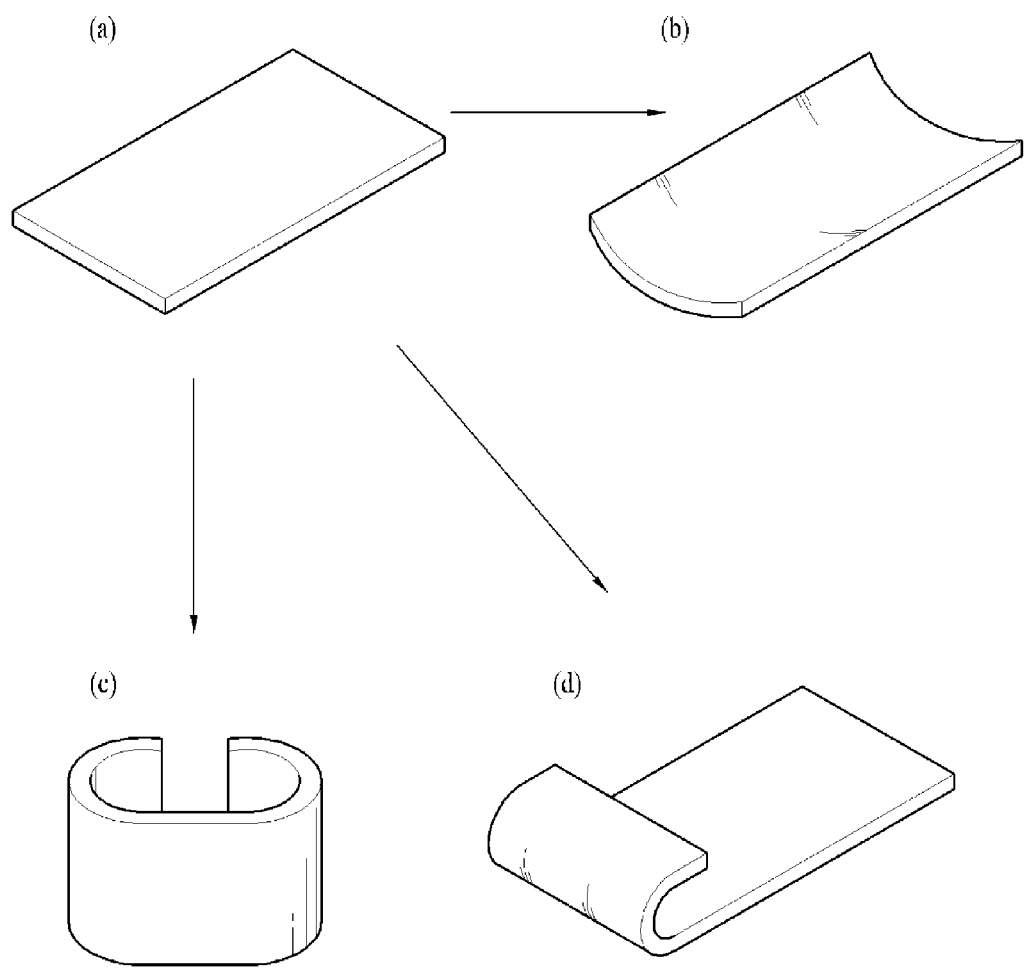
FIG. 1 is a diagram of a flexible display according to one embodiment.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the following description, embodiments are explained in detail with reference to the attached drawings and the contents written on them. A scope intended to claim may be non-limited or non-restricted by the embodiments.

As an electronic device manufacturing technology has been developed, a miniaturization on digital devices is being made. The present specification is related to a portable electronic device. In the following description, the portable electronic device is commonly called a device. The device means a various electronic devices having mobility and may include such an electronic device as a cellular phone, a PDA (personal digital assistants), a notebook, a tablet PC, a MP3 player, a CD player, a DVD player, and the like. In the following description, the electronic device may be abbreviated as a device.

According to the development of a display element technology, a flexible display is being commercialized. The flexible display may indicate the display manufactured on a flexible panel capable of being twisted, bent, and rolled without the loss of a display property unlike a conventional hard display panel. The flexible display is also called an e-paper. The flexible display is lighter, thinner, has more strong impact resistance than the conventional hard display, and has a feature capable of being bent freely.

In case of the flexible display, a panel can be manufactured by a metal foil, an ultrathin glass, or a plastic panel. In particular, in case of the plastic panel, a PC panel, a PET panel, a PES panel, a PI panel, a PEN panel, an AryLite panel and the like can be used.

FIG. 1 is a diagram of a flexible display according to one embodiment. More specifically, the flexible display in FIG. 1 can be classified into a bendable display shown in FIG. 1 (b), a foldable display shown in FIG. 1 (c), and a rollable display shown in FIG. 1 (d) according to flexibility or the extent of flexible.

If a device is equipped with (contain) the flexible display, a display bigger than the size of the device can be provided. In the following description, the flexible display may be called a flexible display unit, a flexible display screen, a flexible display panel, or the like according to a description. The flexible display described in the following means a random flexible display capable of being bent in a random manner including the shapes depicted in FIG. 1 without a loss of the display property. The flexible display includes a touch sensor and may be then able to operate in a manner of sensing a touch input on the display of a user.

Figure 2:
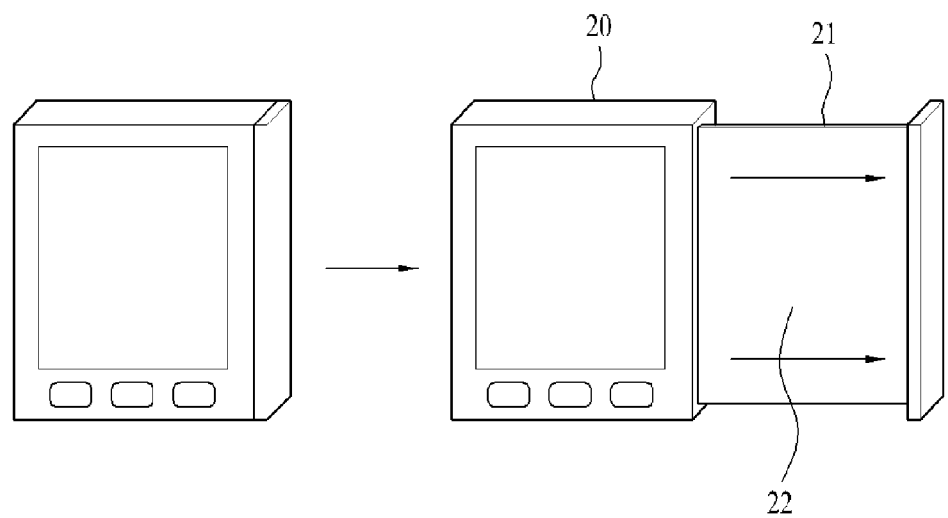
FIG. 2 is a diagram for showing a device equipped with a flexible display according to one embodiment.

FIG. 2 is a diagram for showing a device equipped with a flexible display according to one embodiment.

If a flexible display is used, it is possible to provide a display bigger than the size of a device that carries. Since the flexible display is able to be bent, it can be stored in the device with a smaller volume. In particular, the flexible display such as shown in FIG. 1 is stored in the device in a manner of being folded or rolled up. If a user attempts to use the display or a bigger display, the flexible display can be used in a manner of expanding from the device.

And, the device 20 can be equipped with a main display in the front part and a button can be located at a random part of the device 20. In particular, since a whole or a part of the front part is configured as a display, the button may also be expressed as a display image.

The device 2Q can be equipped with a flexible display 22 and a sliding unit 21. In this case, the sliding unit 21 makes the flexible display slide straightly and enables the flexible display to expand. A whole or a part of the sliding unit 21 can be attached to the back of the flexible display. And, if a user attempts to use an additional display, the flexible display 22 is able to expand manually or automatically.

In the following description, a device is explained with an example of the device equipped with a flexible display as shown in FIG. 2. Yet, the device may be non-limited to the shape shown in FIG. 2 and may mean a device having a various forms equipped with an expandable flexible display.

Figure 3:
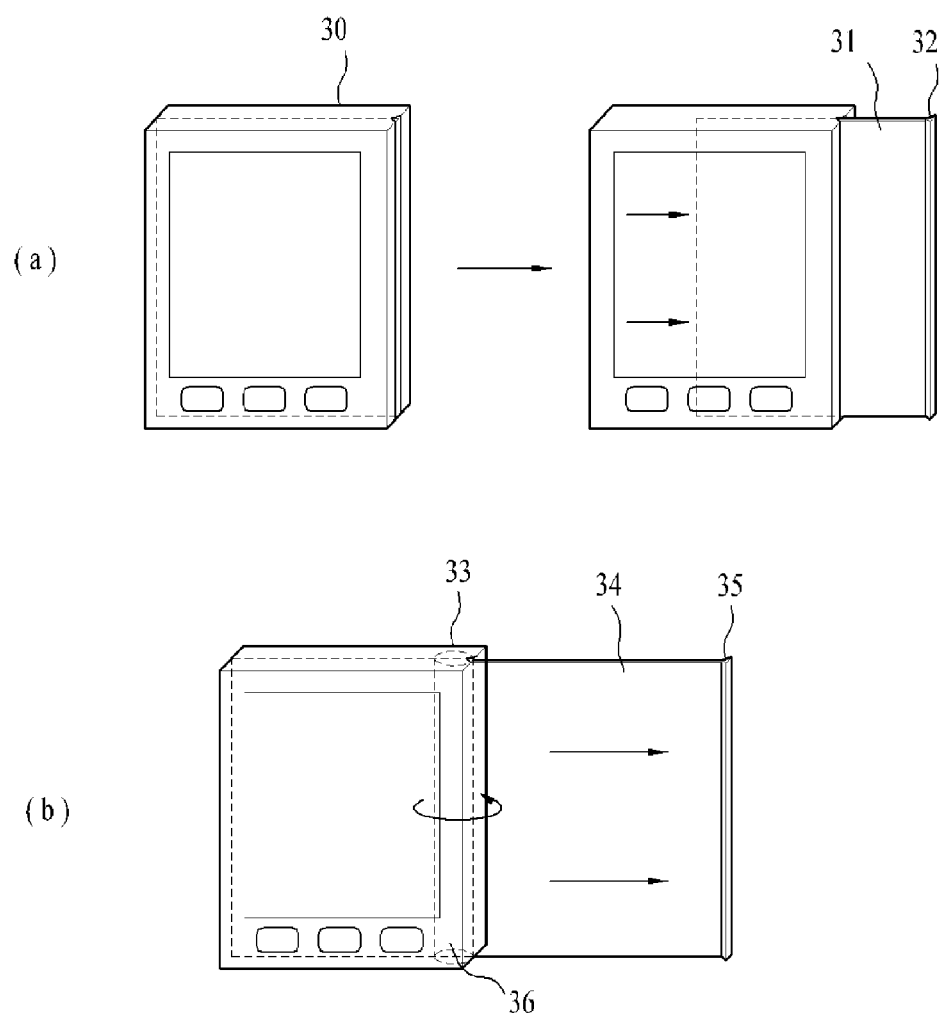
FIG. 3 is a diagram for showing a device according to one embodiment.

FIG. 3 is a diagram for showing a device according to one embodiment. FIG. 3 indicates a device 30 equipped with a flexible display 31 and a housing unit 36 for storing the flexible display 31 added to FIG. 2.

FIG. 3 (a) indicates a case that the flexible display 31 is stored in the device 30 in a manner of being folded. If a user attempts to expand the flexible display 31, the user can expand the flexible display 31 using a handle 32 of the flexible display 31. The flexible display 31 can be stored in the housing unit 36 of the device 30. The housing unit 36 of the device 30 may be a device for storing the flexible display in a manner of folding or rolling. FIG. 3 (a) indicates a case that the flexible display is stored in a manner of being folded or in a manner of being rolled similar to the way of being folded. The housing unit 36 may expand the flexible display 31 automatically according to a device control of a user.

FIG. 3 (b) indicates a case that the flexible display 34 is stored in the device 33 in a manner of being rolled. If a user attempts to expand the flexible display, the user can expand the flexible display 34 using a handle 35 of the flexible display 34. In FIG. 3 (b), the housing unit 36 stores the flexible display 34 in a manner of rolling. In this case, the housing unit 36 may also expand the flexible display 34 automatically according to a device control of a user.

And, it may be able to efficiently store the flexible display 34, which is longer than a prescribed length, in the device 30/33 using both of the storing methods shown in FIG. 3 (a) and FIG. 3 (b).

In case that the flexible display 31/34 expands, the device 30/33 may be able to display an image according to the area or the size of the expanded display. In the present specification, the image may indicate a still image, a video, and other images being represented by various visual methods including the still image and the video capable of being displayed in the display panel.

The flexible display 31/34 may not display an image while being stored in the device 30/33. This is because it saves power consumption and reduces an unnecessary heat. Hence, if the flexible display 31/34 expands, the device 30/33 may begin an image display on the area in which the flexible display has expanded from the device 30/33 and a user is able to see. As mentioned in the foregoing description, if the flexible display 31/34 is rolled out from the device 30/33, the image can be displayed on the display part exposed to the outside of the device 30/33. As the flexible display 31/34 has expanded, it is necessary for the device 30/33 to know the area of the expanded flexible display 31/34 or the length of the expanded flexible display to display an image on the expanded part. Hence, the device 30/33 measures the length of the expanded flexible display 31/34 using a sensor unit or a measuring unit or may be able to measure the area of the expanded flexible display using the measured length.

The device 30/33 includes a length measuring unit for measuring the expanded length of the flexible display and a speed measuring unit for measuring an expansion speed. According to the embodiment, the measuring units may be situated at the inside or outside of the device and may be arranged near the housing unit 36 of the device in which the flexible display 31/34 expands.

The device 30/33 and the flexible display 31/34 shown in FIG. 2 and FIG. 3 are corresponding to an embodiment and the flexible display 31/34 depicted as being folded can unfold and the flexible display 31/34 depicted as being rolled up is able to roll out unlike FIG. 2 and FIG. 3. In particular, a storing form of the flexible display may be not limited to the aforementioned embodiment and it is possible to store in various forms. And, the housing unit 36 may be located at a different part from the part shown in FIG. 2 and FIG. 3.

The present specification simply explains the housing unit 36 for storing the expandable flexible display 31/34 and it is intended to explain the device including the housing unit 36.

Figure 4:
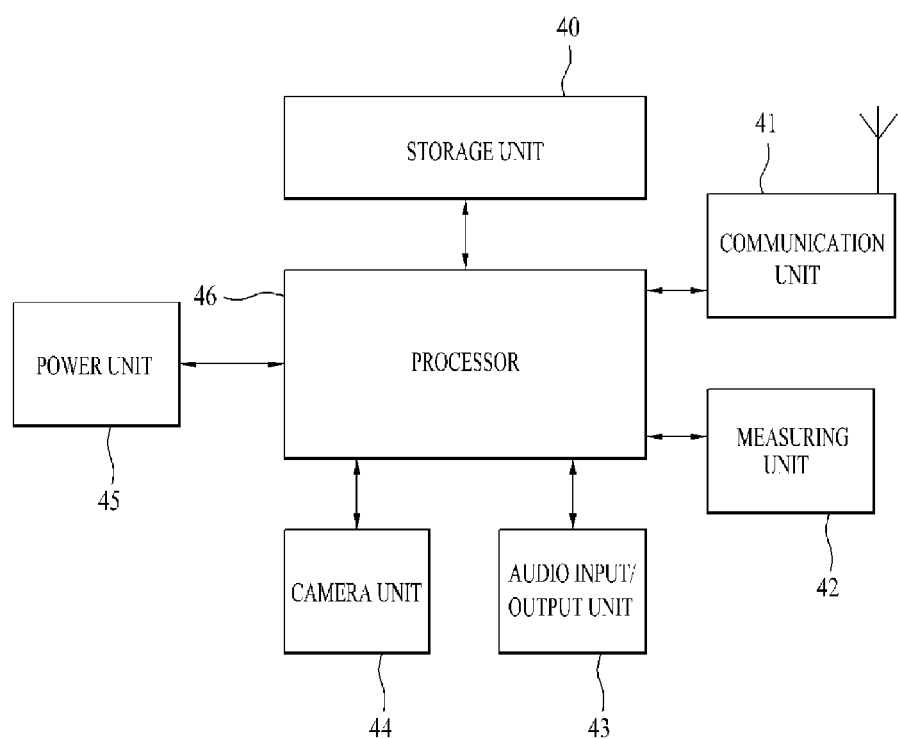
FIG. 4 is a block diagram for showing a device according to one embodiment.

FIG. 4 is a block diagram for showing a device according to one embodiment. Referring to FIG. 4, a device includes a storage unit 40, a communication unit 41, a measuring unit 42, an audio input/output unit 43, a camera unit 44, a power unit 45, and a processor 46.

The storage unit 40 may be able to store such a various digital data as a video, an audio, a picture, a moving image, an application, and the like. The storage unit 40 indicates such a various digital storage space as a flash memory, a HDD (hard disk drive), a SSD (solid state drive), and the like.

And, since the present specification is related to a length indicator of the flexible display, information on the width of the flexible display, the total width of an application execution screen displayed on the flexible display, and the like may be stored in the storage unit.

The communication unit 41 may be able to perform a communication with an external of the device and transceive data with the external of the device using a various protocols. The communication unit 41 accesses an external network by wired or wireless and may be then able to transceive a digital data with the network.

The measuring unit 42 may be able to deliver a user input or the environment recognized by the device to the processor 46 using a plurality of sensors installed in the device. The measuring unit 42 may include a plurality of sensing means. As one embodiment, a plurality of the sensing means may include various sensing means such as a gravity sensor, a terrestrial magnetism sensor, a motion sensor, a gyro sensor, an acceleration sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a speed sensor, and the like.

The measuring unit 42 is a common name for the aforementioned various sensing means. The measuring unit senses various inputs of a user and the environment of the device and may be then able to deliver the sensed result to the device in order for the device to perform an operation according to the sensed result. The aforementioned sensors may be included in the device as a separate element or may be included in the device in a manner of being combined with at least one element.

In the present specification, the measuring unit 42 may include a length measuring unit or a length measuring sensor unit for measuring an expanded area or an expanded length of the flexible display. In case that the flexible display expands, the length measuring unit may measure the length of the flexible display, which has expanded to the external of the device. On the contrary, the length measuring unit may also measure the length of the flexible display, which has not expanded, of the internal of the device.

More specifically, the length measuring unit may be configured with various sensors such as a touch sensor, an infrared/ultraviolet sensor, a photo transistor, a photoconductive element, a position sensitive detector and the like on the flexible display. As the flexible display expands, if the length measuring unit, which is situated at a specific position, is exposed to the external of the device, the length measuring unit may be able to generate an electrical signal as the unit senses a light energy of the external. If the device detects the electrical signal transmitted by the length measuring unit, the device may be able to obtain information on the expanded length of the flexible display on the timing point of detecting.

And, the length measuring unit measures a physical element of the flexible display, which is rolled up in the housing unit, and may be then able to obtain information on unexpanded length of the flexible display. For instance, by measuring or sensing an angular speed of rotating housing unit, it is possible to measure the expanded length of the flexible display. A gyro or gyroscope sensor may be used for measuring the angular speed and the processor 46 may be able to calculate the total length of which the housing unit has spun from the measured angular speed. Or, by sensing a length of a diameter or a radius of the housing unit in which the flexible display has rolled up or by measuring a weight of the housing unit in which the flexible display has rolled up, it may be able to measure how much the flexible display has rolled up in the housing unit.

And, the length measuring unit may be a sensor using a strain gage. Force per unit area is called 'stress' and a changed length of an object for the original length of the object represented as a ratio is called 'strain'. All objects are transformed when a force is given to them. The strain gage may be used to indirectly measure the force in a manner of measuring the extent of the transformation. In particular, there are various kinds of strain gages. Most popular strain gage is a metallic wire or a metallic foil strain gage (foil resistance gage) and it is possible to measure a length using a property that a resistance value changes according to a change of a length.

The length measuring unit can be situated at various positions of the device such as the flexible display itself, a side of the flexible display and the like. The kind of measuring sensor capable of being used as a length measuring unit may also vary. A method of measuring may be differentiated according to the position of the length measuring unit or the kind of sensor of the length measuring unit.

In the present specification, the measuring unit 42 may include a speed measuring unit or a speed measuring sensor unit for measuring an expansion speed of the flexible display. In case that the flexible display expands, the speed measuring unit may be able to measure a speed of the beginning moment of the expansion, an average speed at a specific section, or an instantaneous speed at a specific position of the flexible display.

For instance, the speed measuring unit may be a tachometer using a centrifugal force. The tachometer is configured with a rotation axis rotating with a measurement target in a manner of contacting with the measurement target, an axially moving link instrument and a pendulum attached to the external of the link, and may be able to measure a rotation speed using the centrifugal force. The tachometer may be situated at the housing unit in which the flexible display has rolled up and may be able to measure the speed of expansion or reduction of the flexible display.

And, the speed measuring unit may be a tachometer using a magnetic flux. This tachometer may be able to obtain information on the speed of expansion or reduction when it rotates using a relationship between the frequency of generated electromotive force and the number of rotation. Or, if a coil is rotated between magnetic poles, voltage is generated in proportion to the changing speed of the magnetic flux. By using this, the speed of expansion or reduction can be measured.

The speed measuring unit may be able to include all of the various speed measuring sensors such as a tachometer using a centrifugal force, a stroboscope, a magnetic pick-up, a tacho-generator, and the like and may be non-limited to the aforementioned embodiment. And, the speed measuring unit may be situated at various positions of the device such as the flexible display itself, a side of the flexible display and the like. A method of speed measuring may be differentiated according to the position of the speed measuring unit or the kind of sensor of the speed measuring unit.

Besides, the measuring unit 42 may be able to include all of the measuring sensors capable of measuring a travel length, a length, an angular speed, an expansion speed, a reduction speed, and an average speed such as a laser length measuring sensor, a potentiometer, and the like. The measuring sensor may be non-limited to the form of the aforementioned sensor and the above mentioned principle of the measuring unit 42 is just one embodiment of the measuring unit.

The audio input/output unit 43 may include an audio output means such as a speaker, etc. and an audio input means such as a microphone, etc. and may be able to perform an audio output from the device and audio input to the device. The audio input/output unit 43 can be used as an audio sensor.

The camera unit 44 may be able to perform a photographing and a taking moving image and may be selectively equipped according to embodiment. The camera unit 44 may be used as the aforementioned motion sensor or a visual sensor.

The power unit 45 is a power source connected to a battery of the internal of the device or an external power supply. It is able to supply a power to the device.

The processor 46 executes various applications stored in the storage unit 40 and may be able to process data of the internal of the device. And, the processor controls the units of the aforementioned device and may be able to manage data transmission and reception between the units. And, the processor may be able to control an output of the image displayed on the display screen.

In case that the aforementioned flexible display expands, the processor 46 may be able to display an image according to the expanded area. More specifically, the processor may be able to display the image according to the expanded area in a manner of adjusting the size of the image, a resolution and the like and may be able to control a different image to be displayed according to the size. And, the processor 46 also performs a role of controlling a display image, i.e., displaying an image in a display panel, giving an animation effect on the displayed image and the like.

The processor 46 may be able to control an output of a vibration or an audio according to the expanded area or length. More specifically, the processor may be able to control an audio, kind of vibration, strength, intensity and the like outputted according to the expanded length.

FIG. 4 is a block diagram according to one embodiment. Blocks represented in a manner of being separated indicate the logically distinguished elements of the device. Hence, the elements of the aforementioned device may be equipped with a single chip or a plurality of chips according to the design of the device.

Figure 5:
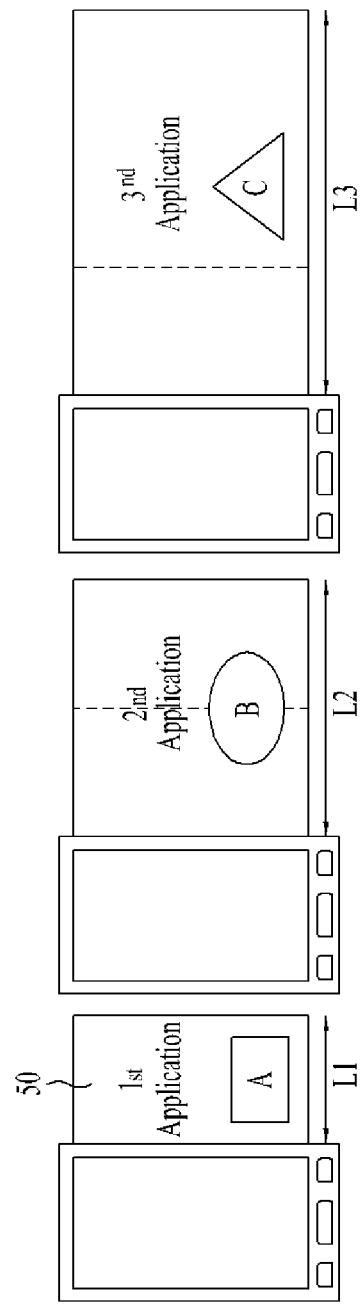
FIG. 5 and FIG. 6 are diagrams for showing a device controlling an application execution in accordance with an expansion length of a flexible display according to one embodiment.

FIG. 5 is a diagram for showing a device controlling an application execution in accordance with an expansion length of a flexible display according to one embodiment.

The application displayed on a flexible display may be controlled by executing a command corresponding to a user input by the device. For instance, in case that a user touched an icon, the device may be able to execute an application corresponding to the icon touch input. The present embodiment indicates that the expansion length (L1, L2, and L3) of the flexible display becomes a user input and the device executes an application in response to the user input. Hence, in case that the flexible display expanded as much as each of unit lengths (L1, L2, and L3), the device may be able to execute an application corresponding to each of the unit lengths (L1, L2, and L3). For instance, in case that the flexible display expanded as much as a first unit length, the device may be able to execute a first application corresponding to the first unit length (L1). Meanwhile, a second application is corresponding to a second unit length (L2) and a third application is corresponding to a third unit length (L3).

Yet, since an application is controlled according to the length (L1, L2, and L3) of the flexible display in the present embodiment, if there is no separate user input, the application can be executed in case that the flexible display expanded as much as each of the unit lengths. Hence, it may be necessary to control the execution of the application in a section where the flexible display expands from a unit length to a next unit length. Therefore, the present specification intends to define a method of controlling application and operation in the section where the flexible display expands from each unit length to a next unit length. Since the present specification describes the invention regarding a device for controlling an execution of application according to the unit length (L1, L2, and L3), the following embodiments are based upon the premise that the device controls the execution of the application according to the expansion length of the flexible display. And, the present specification is based upon the premise that the second unit length is longer than the first unit length and the third unit length is longer than the second unit length.

Meanwhile, the unit length (L1, L2, and L3) of the flexible display, a gap between the unit lengths, and the application executed according to the unit length can be variously configured by a user and may be non-limited to the above mentioned embodiment.

Figure 6:
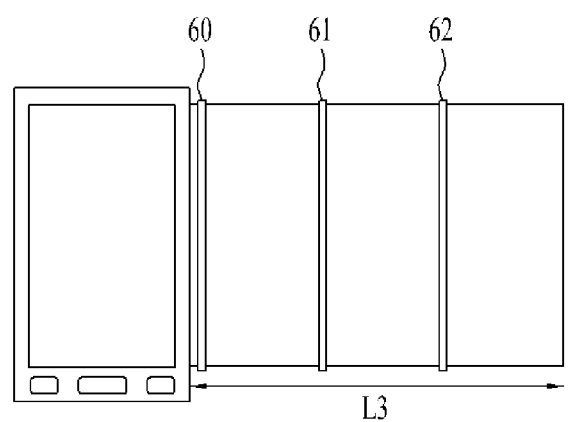

FIG. 6 is a diagram for showing a device controlling an execution of an application in accordance with an expansion length of a flexible display according to one embodiment. More specifically, the diagram shows a device indicating a section for measuring an expansion speed of the flexible display.

According to the present embodiment, as mentioned in FIG. 5, if the flexible display expands to a pre-set unit length, the device executes an application corresponding to each unit length. The application of the device can be controlled at last only when the flexible display expands to each of the unit length (L1, L2, and L3). In other word, the device just displays an application execution screen, which is currently displayed, and may not perform any particular operation until the flexible display expands to a next unit length. For instance, in case that the flexible display expands more than the first unit length and less than the second unit length, the first application execution screen may be continuously displayed on the flexible display. This may be an operation of the device, which is not coincided with the intention of a user that expanded the flexible display. For instance, in case that the flexible display expands more than the first unit length by the user who knows that an application execution is controlled according to each of the unit length, it is reasonable to see that the expansion is intended to execute an application corresponding to the second or third unit length. And, if the first application execution screen is continuously displayed, there may be a certain space in the flexible display. Because the second application can be executed after the flexible display has expanded to the second unit length. The space may wear off the design effect. And, there may be a problem of power waste resulted from continuously displaying the unnecessary first application execution screen.

In order to supplement the problem, the present specification intends to define an operation of the device in the section where the flexible display expands from each unit length to a next unit length. The device may be able to control an application execution screen displayed on the flexible display according to a pre-set control criteria. The present specification selects an expansion speed of the flexible display as the control criteria of the device operation. The expansion speed may be 1) an average speed at a specific length section of the flexible display or 2) an instantaneous speed at, a point where the flexible display has expanded to a specific length. The expansion speed described in the present specification selects the instantaneous speed as its criterion. Yet, the expansion speed of the present specification may be non-limited to the instantaneous speed and may also include the average speed at a specific expansion section of the flexible display. In case that the average speed is selected as a criteria of the expansion speed, a speed measuring may be performed at plus or minus of a prescribed length from each of the unit lengths.

The instantaneous speed measuring may be performed at a beginning moment of the expansion 60, the moment of expanded to a first length 61, and the moment of expanded to a second length 62. The device may be able to determine whether the application execution screen displayed on the flexible display is displayed in a manner of being expanded or whether the application execution screen is changed according to the measured speed. How to control the device according to the speed measured at each section (60, 61, and 62) shall be described in the following FIG. 7 to FIG. 10.

FIG. 7 is a diagram for showing a device expanding a flexible display according to one embodiment. More specifically, it is the diagram of the device controlling a display of an application execution screen according to the speed of the beginning moment of expansion of the flexible display.

Figure 7A:
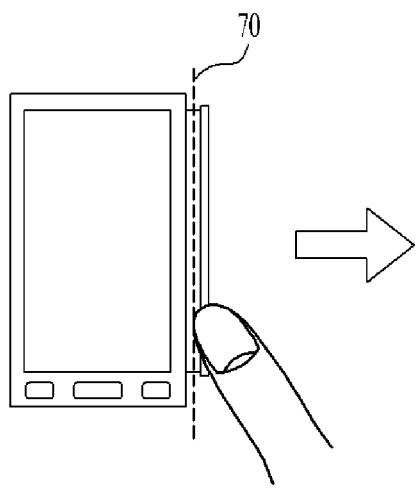
FIG. 7 is a diagram for showing a device expanding a flexible display according to one embodiment.

FIG. 7a is a table organizing operations of the application, which is displayed according to the speed of the beginning moment of expansion. In case that the speed of the beginning moment of expansion 70 is faster than a designated speed, the second application execution screen can be displayed. On the contrary, in case that the speed of the beginning moment of expansion 70 is slower than the designated speed, the first application execution screen can be displayed. The fact that the speed of the beginning moment of first expansion 70 is faster than the designated speed may mean that a user has expanded the flexible display more than a prescribed length in a unit time. It is reasonable to see that the user aimed to expand the flexible display not to the first unit length but to the second unit length. Hence, in case that the expansion speed is faster than the designated speed, a device may be able to display a second application on the flexible display. On the contrary, the fact that the speed of the beginning moment of expansion 70 is slower than the designated speed may mean that the user has expanded the flexible display less than a prescribed length in a unit time. It is reasonable to see that the user aimed to expand the flexible display not to the second unit length but to the first unit length. Hence, in case that the expansion speed is slower than the designated speed, the device may be able to display a first application on the flexible display. An application execution screen is displayed according to the speed of the beginning moment of expansion of the flexible display, thereby controlling the display of the application execution screen more efficiently and intuitively.

Figure 7B:
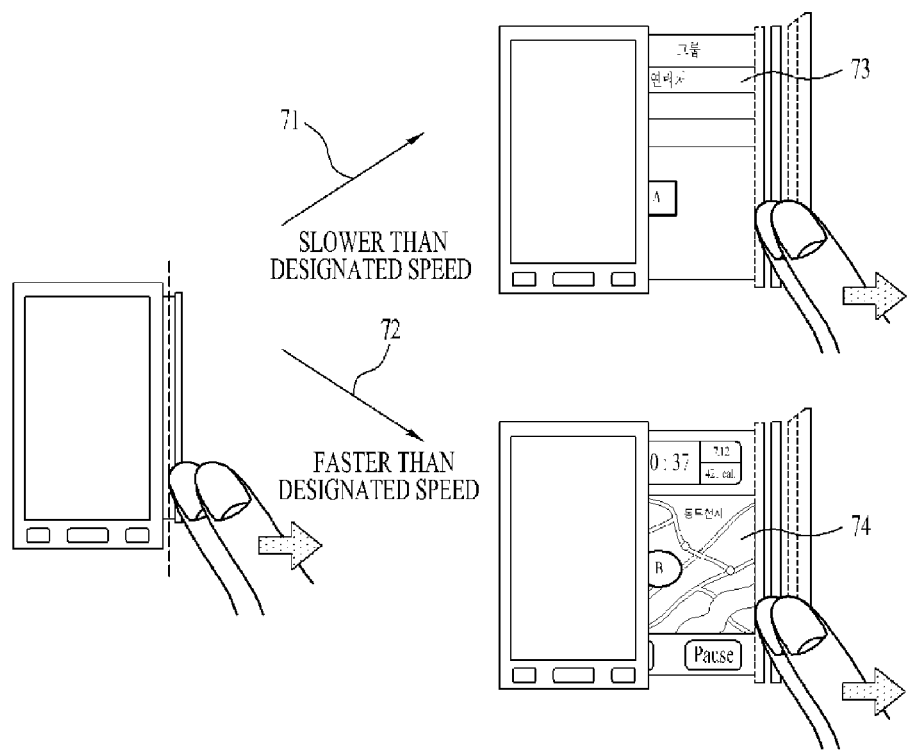

FIG. 7b is a diagram for showing a device controlling a display of an application (73/74) execution screen in accordance with the speed measured at the beginning moment of expansion 70 according to one embodiment. In case that the flexible display expands slower than the designated speed 71, the device may be able to display a first application 73 execution screen corresponding to a first unit length. In case that the flexible display expands faster that the designated speed 72, the device may be able to display a second application 74 execution screen corresponding to a second unit length. Hence, in case that the flexible display expands less than the first unit length 71/72, the execution screen of the first application 73 or the second application 74 can be displayed on the flexible display according to the expansion speed. The application execution screen 73/74 displayed on the flexible display can be gradually displayed in response to the expansion length of the flexible display. In other word, as the flexible display expands, the application execution screen 73/74 can be gradually displayed as much as the length of the expanded flexible display. Or, the whole of the application execution screen is displayed in a manner of being reduced to the width of the flexible display and may be then able to display it in a manner of being expanded as the flexible display expands. Meanwhile, the second unit length may be longer than the first unit length. Or, the whole width of the second application execution screen 74 may be longer than the whole width of the first application execution screen 73.

Meanwhile, as a different embodiment, the display of the application execution screen can be controlled according to the expansion beginning speed of the flexible display. The display of the application execution screen can be controlled according as the expansion beginning speed of the flexible display is faster or slower than the designated speed. More specifically, in case that the expansion speed of the flexible display is slower than the designated speed, the application execution screen corresponding to each unit length can be displayed sequentially as the flexible display expands. On the contrary, in case that the expansion speed of the flexible display is faster than the designated speed, the application execution screen corresponding to the unit length at which the expansion of the flexible display is stopped can be displayed only.

More specifically, in case that the expansion speed of the flexible display is slower than the designated speed as mentioned in FIG. 5, if the flexible display expands to each of unit lengths (L1, L2, and L3), the application execution screen corresponding to each of the unit lengths (L1, L2, and L3) can be displayed. The application execution screen can be gradually displayed in response to the change of the expansion length of the flexible display. For instance, the first application execution screen can be displayed gradually from a part to the whole on the display until the flexible display expands to the first unit length. In other word, a part of the execution screen can be displayed on the flexible display as much as the expanded length of the flexible display and if the flexible display expands to the first unit length, the whole of the first application execution screen can be displayed. Or, in case that the flexible display expands to each of the unit lengths, the application execution screen corresponding to each of the unit lengths can be displayed. In this case, unlike the aforementioned embodiment, the expansion speed at each of the unit lengths may not be '0'. For instance, in case that the flexible display expands to the third unit length without a stop, the application execution screen corresponding to each of the unit lengths can be displayed in order when the flexible display has expanded to the first unit length and the second unit length. On the contrary, in case that the expansion beginning speed of the flexible display is faster than the designated speed, execution screen is not displayed until the flexible display expands to a unit length corresponding to a selected application and then the application execution screen can be displayed at last when the flexible display has expanded to the unit length. More specifically, if the expansion is stopped at a specific unit length while the flexible display expands, the application execution screen corresponding to a unit length less than the specific unit length is not displayed and then the application execution screen corresponding to the specific unit length can be displayed. For instance, in case that the flexible display expands to the third unit length without a stop in a manner of expanding faster than the designated speed, the first and second application execution screen are not displayed and the third application execution screen can be displayed only.

Meanwhile, as a different embodiment, the designated speed may have two kinds of state, a first designated speed and a second designated speed. In this case, the second designated speed may be greater than the first designated speed. As the designated speed has 2 kinds of state, the device may be able to display 3 kinds of application execution screen according to the speed of beginning moment of expansion of the flexible display. For instance, in case that the speed of beginning moment of expansion is slower than the first designated speed, the device may be able to display the first application execution screen. Or, in case that the speed of beginning moment of expansion is faster than the first designated speed and slower than the second designated speed, the device may be able to display the second application execution screen. Or, in case that the speed of beginning moment of expansion is faster than the second designated speed, the device may be able to display the third application execution screen.

The application selected according to the speed of beginning moment of expansion can be gradually displayed in response to the expanded length of the flexible display. For instance, in case that the speed of beginning moment of expansion of the flexible display is slower than the first designated speed, the first application execution screen can be gradually displayed on the flexible display according to the expanded length. Or, in case that the flexible display expands to the unit length corresponding to the selected application, the application execution screen may be displayed. For instance, in case that the speed of beginning moment of expansion of the flexible display is slower than the first designated speed, if the flexible display expands as much as a first length, the first application execution screen can be displayed. And, in case that the speed of beginning moment of expansion of the flexible display is faster than the first designated speed and slower than the second designated speed, if the flexible display expands as much as a second length, the second application execution screen can be displayed. And, in case that the speed of beginning moment of expansion of the flexible display is faster than the second designated speed, if the flexible display expands as much as a third length, the third application execution screen can be displayed. In particular, the execution screen is not displayed until the flexible display expands to the unit length corresponding to the selected application and then the application execution screen can be displayed at last when the flexible display has expanded to the unit length.

FIG. 8 is a diagram for showing a device of which a flexible display expanded as much as a unit length according to one embodiment.

FIG. 8a is a table organizing operations of the application, which is displayed according to the speed measured at the first unit length 80, in case that the flexible display expands more than the first unit length and less than the second unit length. The device may be able to measure the speed of the moment of which the flexible display expanded as much as the first unit length 80. The device compares the measured speed with the designated speed and may be then able to control the display of the application execution screen. More specifically, the device controls a display of the application execution screen currently displayed on the flexible display or may be able to display an application execution screen corresponding to a next unit length according to the measured speed. In case that the measured speed is slower than the designated speed, the device may be able to continuously display the application execution screen currently displayed on the flexible display or may be able to display it in a manner of enlarging. On the contrary, in case that the measured speed is faster than the designated speed, the device may be able to display an application executing screen corresponding to a next unit length of the unit length at which the speed is measured. For instance, since the device measured the speed in the first unit length 80 in the present embodiment, the next unit length may be a second unit length.

More specifically, in case that the first application executing screen is currently displayed, the device compares the expansion speed at the first unit length 80 with the designated speed and may be then able to control the display of the application execution screen. In case that the expansion speed at the first unit length 80 is slower than the designated speed, the device may be able to display the whole of the first application execution screen currently displayed in a manner of being expanded. The executing screen can be displayed in a manner of being expanded to correspond to the expanded length of the flexible display. On the contrary, in case that the expansion speed at the first unit length 80 is faster than the designated speed, the device executes a second application corresponding to the next unit length, which is the second unit length, and may be then able to display the second application on the flexible display.

In case that the second application executing screen is currently displayed, the device compares the expansion speed at the first unit length 80 with the designated speed and may be then able to control the display of the application execution screen. In case that the speed at the first unit length 80 is slower than the designated speed, the device may be able to continuously display the application execution screen currently displayed. Hence, the device may be able to display the second application execution screen in response to the expanded length of the flexible display. In case that the speed at the first unit length 80 is faster than the designated speed, the device may be able to display the second application execution screen as well because the next unit length of the first unit length 80 is the second unit length and the second application execution screen is currently displayed. Hence, in case that the second application execution screen is currently displayed, the device may be able to display the second application execution screen in response to the expanded length of the flexible display irrespective of the designated speed.

As mentioned in FIG. 5, since the present specification describes a device controlled according to the length of the flexible display, in case that the flexible display stops the expansion in the first unit length 80, the first application execution screen can be displayed. In other word, in case that the expansion speed at the first unit length 80 is '0', the first application execution screen can be displayed irrespective of the execution screen currently displayed. In this case, the expansion speed may be either an instantaneous speed or an average speed. In case of the average speed, it may mean that the expanded length is '0' for a prescribed time.

Figure 8B:
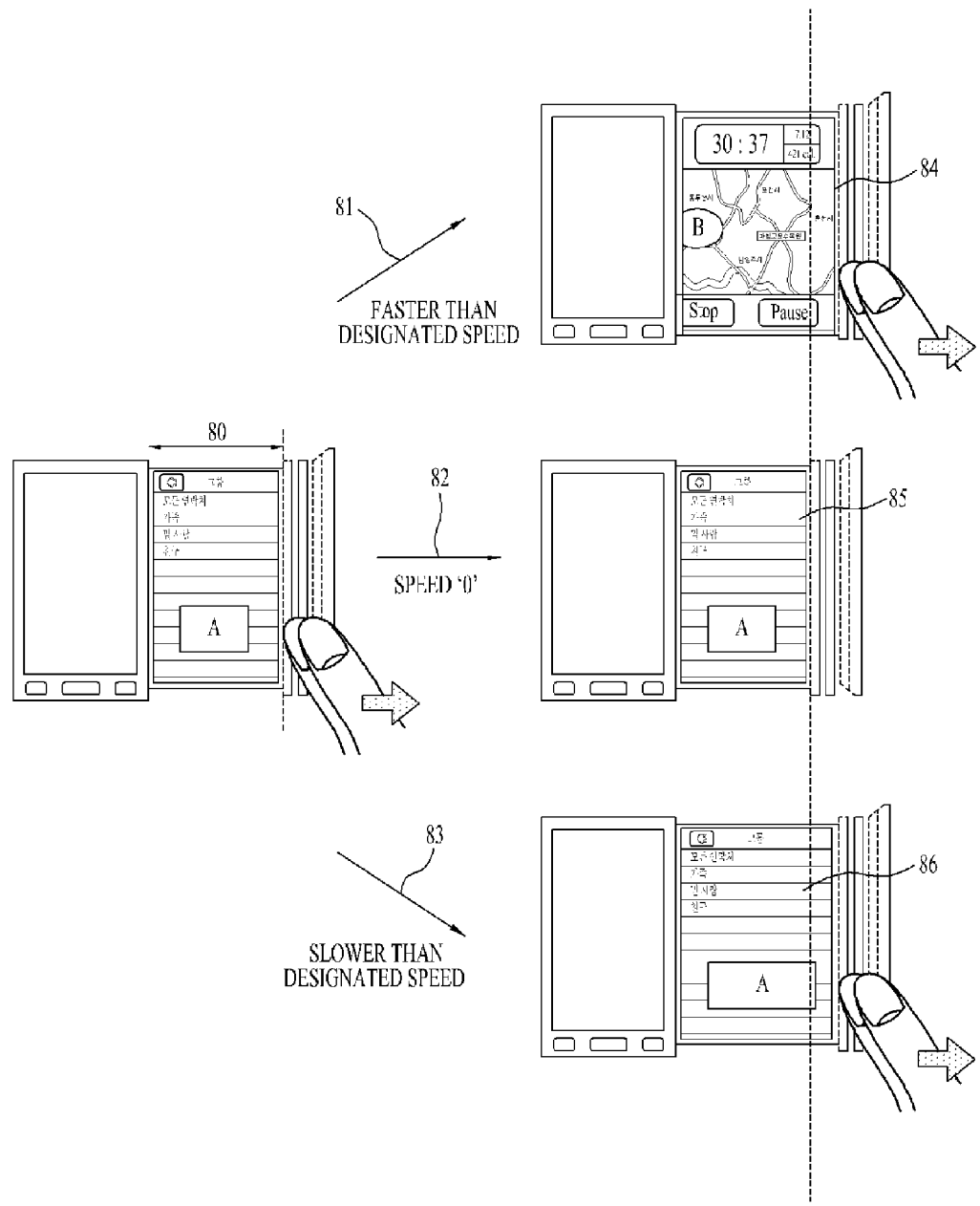
FIG. 8 and FIG. 9 are diagrams for showing a device of which a flexible display expanded as much as a unit length.

FIG. 8b is a diagram for showing a device controlling a display of an application execution screen according to the speed of moment of which the flexible display expands as much as the first unit length 80, in case that the first application executing screen is currently displayed. Three kinds of state may exist according to the speed of moment of which the flexible display expands as much as the first unit length 80. In case that the expansion speed is faster than the designated speed 81, the device may be able to display the second application 84 execution screen corresponding to the second unit length. Or, in case that the flexible display stops the expansion in the first unit length 80, the device may be able to display the first application 85. Or, in case that the expansion speed of the flexible display is slower than the designated speed 83, the device may be able to display the first application execution screen corresponding to the first unit length in a manner of enlarging 86. Hence, in case that the flexible display expands greater than the first unit length and less than the second unit length, the execution screen of the first application or the second application can be displayed on the flexible display. The application execution screen (84, 85, and 86) displayed on the flexible display can be gradually displayed in response to the expanded length of the flexible display. In other word, as the flexible display expands, the application execution screen (84, 85, and 86) can be gradually displayed as much as the expanded length of the flexible display. Or, the whole of the application execution screen is displayed in a manner of being reduced to fit the width of the flexible display and may be then displayed in manner of being enlarged as the flexible display expands. Meanwhile, in this case, the second unit length may be longer than the first unit length. Or, the whole of the width of the second application execution screen may be longer than the whole of the width of the first application execution screen.

Meanwhile, an instantaneous speed at a specific length is selected as a criterion in the present embodiment. Yet, it may be non-limited to the instantaneous speed and an average speed may be selected as a criterion. The average speed may be the average speed at a specific length section of the flexible display. The specific length section of the flexible display may include a specific expansion length section prior to the expansion to each of the unit lengths. And, the specific length section of the flexible display can be variously configured by a user. As mentioned in the foregoing description, the display of application execution screen can be controlled according to the measured average speed.

FIG. 9 is a diagram for showing a device of which a flexible display expanded as much as a unit length according to one embodiment.

FIG. 9*a* is a table organizing operations of the application, which is displayed according to the speed measured at the second unit length 901, in case that the flexible display expands greater than the second unit length 901 and less than the third unit length. The device may be able to measure the speed of the moment of which the flexible display expanded as much as the second unit length 901. The device compares the measured speed with the designated speed and may be then able to control the execution of the application. More specifically, the device controls the display of the application execution screen currently displayed or may be able to display the application execution screen corresponding to a next unit length according to the measured speed. In case that the measured speed is slower than the designated speed, the device may be able to continuously display the application execution screen currently displayed on the flexible display or may be able to display it in a manner of enlarging. On the contrary, in case that the measured speed is faster than the designated speed, the device may be able to execute an application corresponding to a next unit length of the unit length at which the speed is measured. For instance, since the device measures the speed at the second unit length 91 in the present embodiment, the next unit length may be a third unit length.

More specifically, in case that the first application executing screen is currently displayed in a manner of being enlarged, the device compares the expansion speed at the second unit length 901 with the designated speed and may be then able to control the display of the application execution screen. In case that the expansion speed at the second unit length 901 is slower than the designated speed, the device may be able to display the whole of the first application execution screen currently displayed in a manner of expanding. The executing screen can be displayed in a manner of being expanded to correspond to the expanded length of the flexible display. On the contrary, in case that the expansion speed at the second unit length 901 is faster than the designated speed, the device executes a third application corresponding to the next unit length, which is the third unit length, and may be then able to display the third application on the flexible display.

In case that the second application executing screen is currently displayed, the device compares the expansion speed at the second unit length 901 with the designated speed and may be then able to control the display of the application execution screen. In case that the speed at the second unit length 901 is slower than the designated speed, the device may be able to continuously display the application execution screen currently displayed. Hence, the device may be able to display the second application execution screen in response to the expanded length of the flexible display. On the contrary, in case that the speed at the second unit length 901 is faster than the designated speed, the device may be able to execute the third application corresponding to the next unit length, which is the third unit length, and may be then able to display the third application on the flexible display.

As mentioned in FIG. 5, since the present specification describes a device controlled according to the length of the flexible display, in case that the flexible display stops the expansion in the second unit length 901, the second application is executed and the second application execution screen can be displayed. In other word, in case that the expansion speed at the second unit length 901 is '0', the second application execution screen can be displayed irrespective of the execution screen currently displayed. In this case, the expansion speed may be either an instantaneous speed or an average speed. In case of the average speed, it may mean that the expanded length is '0' for a prescribed time.

Figure 9B:
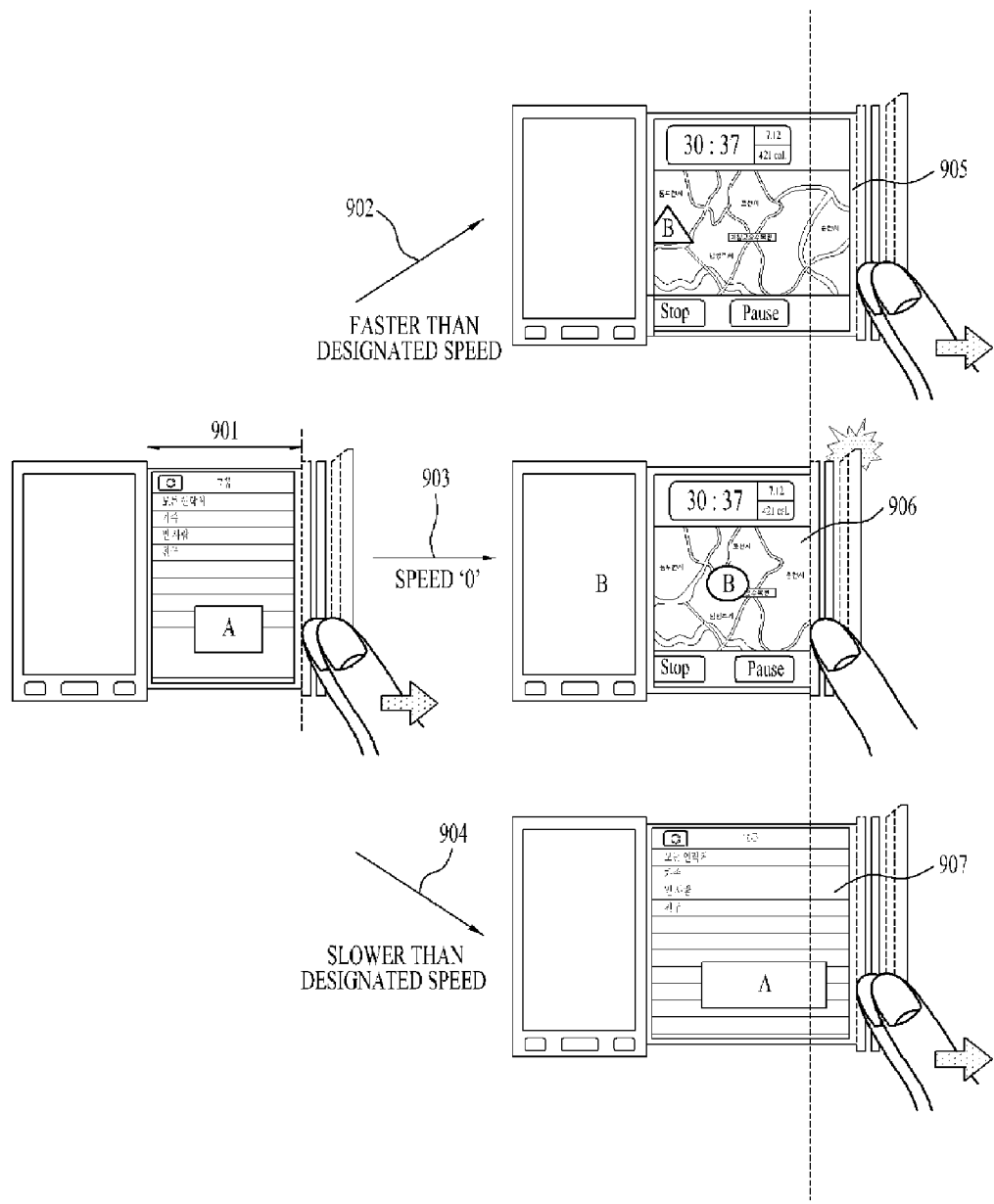

FIG. 9*b* is a diagram for showing a device controlling a display of an application execution screen according to the speed of moment of which the flexible display expanded as much as the second unit length 901, in case that an enlarged first application executing screen is currently displayed. Three kinds of state may exist in the application displayed on the flexible display. In case that the expansion speed of the flexible display is faster than the designated speed 902, the device may be able to display the third application 905 execution screen corresponding to the third unit length. Or, in case 903 that the flexible display stops the expansion in the second unit length 901, the device may be able to display the second application 906 execution screen. Or, in case that the expansion speed of the flexible display is slower than the designated speed 904, the device may be able to display the first application execution screen corresponding to the first unit length in a manner of enlarging. In particular, in case that the flexible display expanded greater than the second unit length 901 and less than the third unit length, the execution screen of the first to the third application (905, 906, and 907) can be displayed on the flexible display. Meanwhile, in this case, the second unit length 901 may be longer than the first unit length and the third unit length may be longer than the second unit length 901. And, the whole of the width of the second application execution screen may be longer than the whole of the width of the first application execution screen. And, the whole of the width of the third application execution screen may be longer than the whole of the width of the second application execution screen.

Figure 9C:
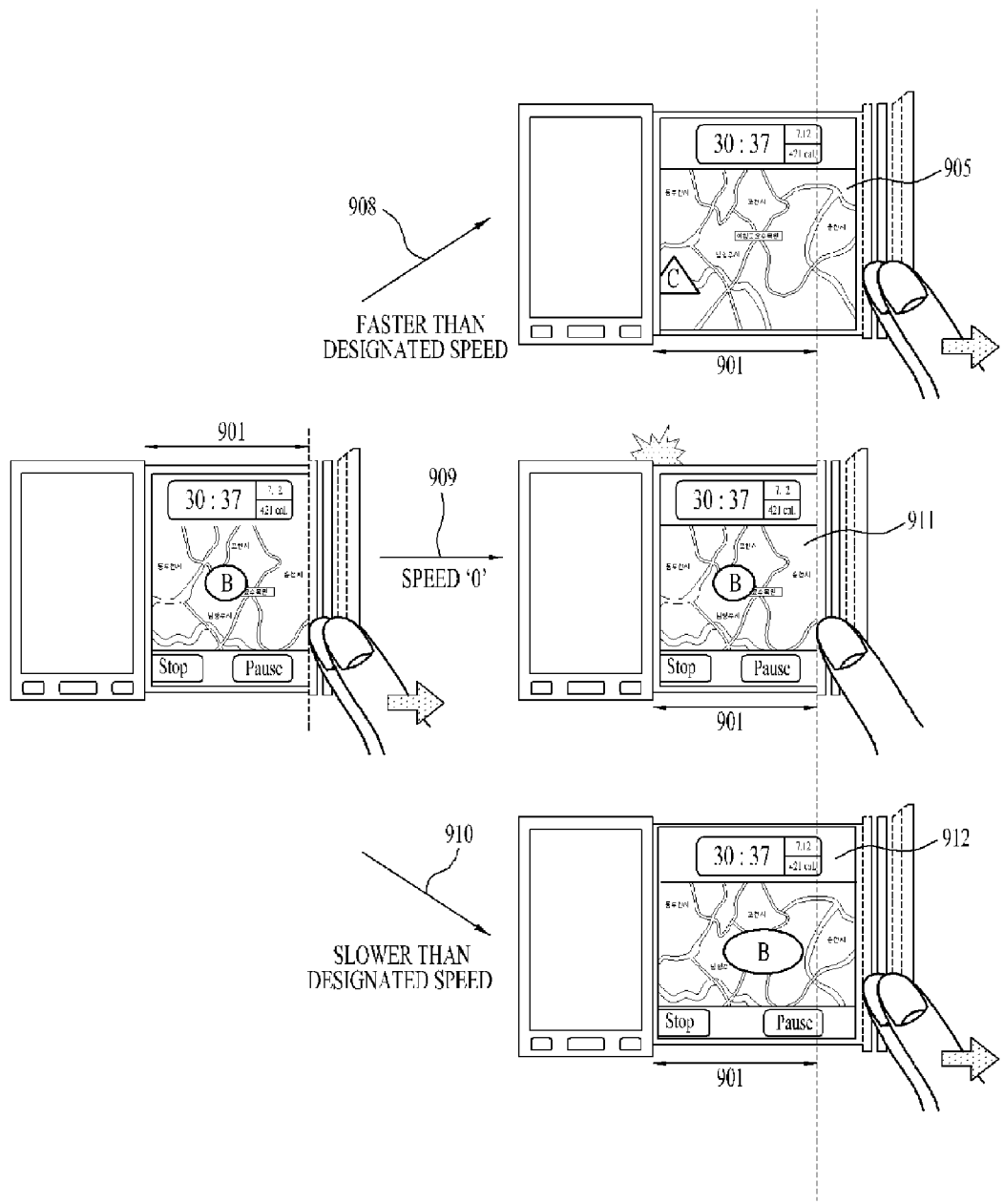

FIG. 9*c* is a diagram for showing a device controlling a display of an application execution screen according to the speed of moment of which the flexible display expanded as much as the second unit length 901, in case that an enlarged second application executing screen is currently displayed. Three kinds of state may exist in the application displayed on the flexible display. In case that the expansion speed of the flexible display is faster than the designated speed 908, the device may be able to display the third application 905 execution screen corresponding to the third unit length. Or, in case that the flexible display stops the expansion in the second unit length 909, the device may be able to display the second application 911. Or, in case that the expansion speed of the flexible display is slower than the designated speed 910, the device may be able to display the second application execution screen 912 corresponding to the second unit length in a manner of enlarging. In particular, in case that the flexible display expanded greater than the second unit length 901 and less than the third unit length, the execution screen of the first to the third application (905, 911, and 912) can be displayed on the flexible display. Meanwhile, in this case, the second unit length 901 may be longer than the first unit length 900 and the third unit length may be longer than the second unit length. And, the whole of the width of the second application execution screen may be longer than the whole of the width of the first application execution screen and the whole of the width of the third application execution screen may be longer than the whole of the width of the second application execution screen.

Meanwhile, an instantaneous speed at a specific length is selected as a criterion in the present embodiment. Yet, it may be non-limited to the instantaneous speed and an average speed may be selected as a criterion. The average speed may be the average speed at a specific length section of the flexible display. The specific length section of the flexible display may include a specific expansion length section prior to the expansion to each of the unit lengths. And, the specific length section of the flexible display can be variously configured by a user. As mentioned in the foregoing description, the display of application execution screen can be controlled according to the measured average speed.

Figure 10:
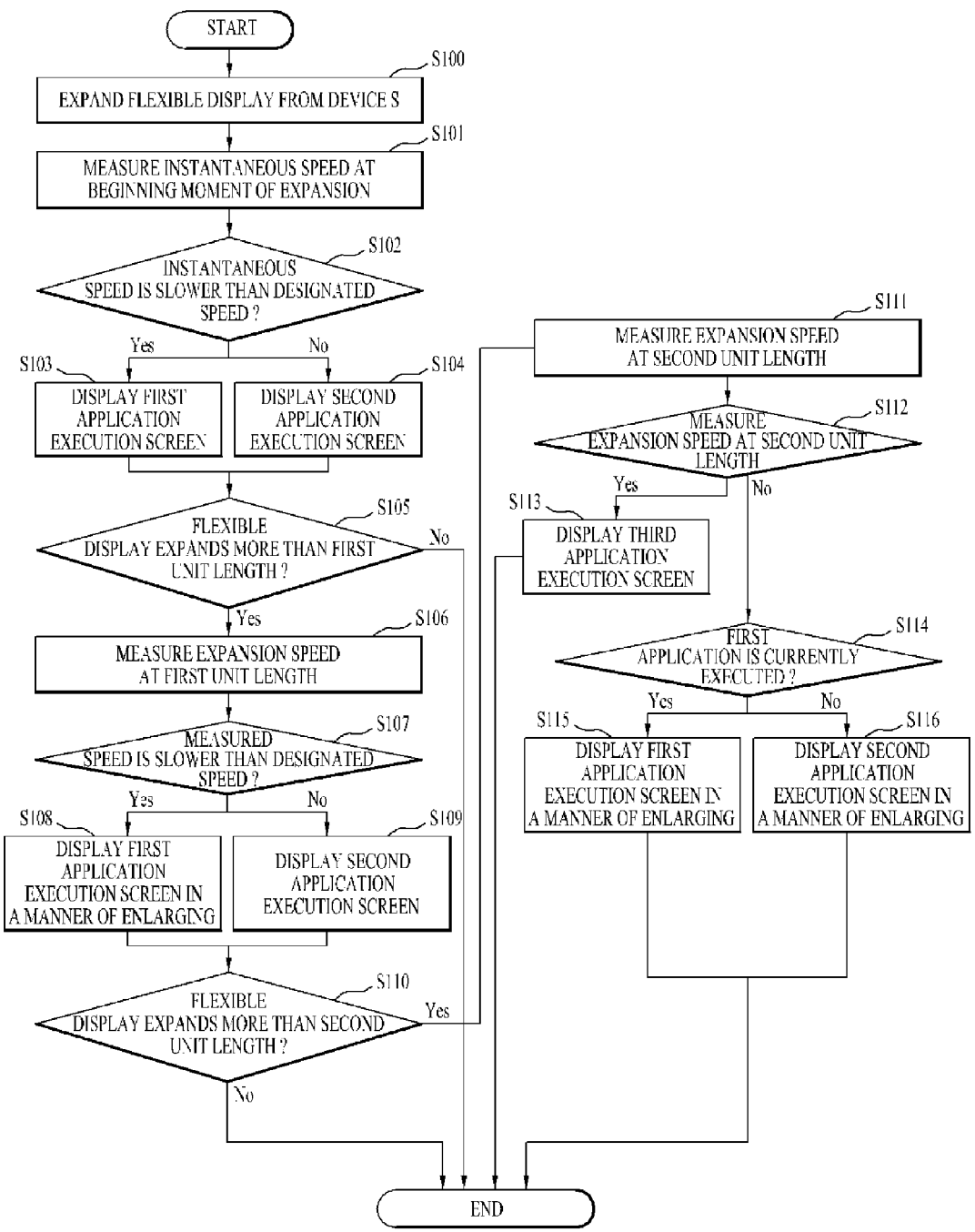
FIG. 10 is a flowchart for showing a device that a display of an application execution screen is controlled in accordance with an expansion speed of a flexible display according to one embodiment.

FIG. 10 is a flowchart for showing a device controlling a display of an application execution screen in accordance with an expansion speed of a flexible display according to one embodiment.

First of all, the flexible display may be able to expand from the device [S100]. Next, the device may be able to measure the speed of the beginning moment of expansion [S101]. In case that the measured speed is slower than the designated speed [S102], the device may be able to display a first application execution screen [S103]. On the contrary, in case that the measured speed is faster the designated speed [S102], the device may be able to display a second application execution screen [S104].

Next, in case that the flexible display expands more than the first unit length [S105], the device may be able to measure the speed of the moment of which the flexible display expanded to the first unit [S106]. In case that the flexible display does not expand more than the first unit length, process may be ended. In case that the speed measured at the first unit length is slower than the designated speed [S107], the device may be able to display the first application execution screen corresponding to the first unit length in a manner of enlarging [S108]. In case that the speed measured at the first unit length is faster than the designated speed [S107], the device may be able to display the second application execution screen corresponding to the second unit length [S109].

Next, in case that the flexible display expands more than the second unit length [5110], the device may be able to measure the speed of the moment of which the flexible display expanded to the second unit [S111]. In case that the flexible display does not expanded more than the second unit length, process may be ended. In case that the speed measured at the second unit length is faster than the designated speed [S112], a third application execution screen corresponding to a third unit length is displayed and process may be ended [S112]. In case that the speed measured at the second unit length is slower than the designated speed [S112], the device may be able to determine whether the first application is displayed on the flexible display [S114]. In case that the first application execution screen is displayed, the device may be able to display the first application execution screen in a manner of enlarging in response to the expanded length of the flexible display [S115]. In case that the second application execution screen is displayed, the device may be able to display the second application execution screen in a manner of enlarging in response to the expanded length of the flexible display [S116].

Figure 11:
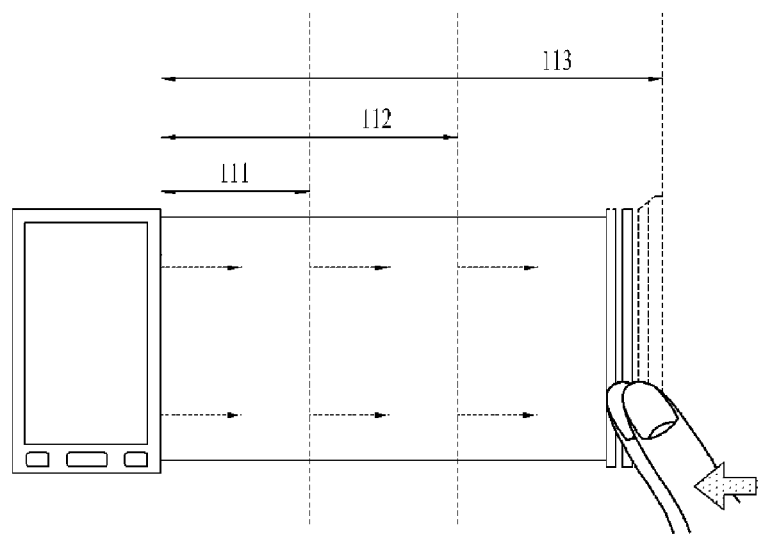
FIG. 11 is a diagram for showing a device that a display of an application execution screen is controlled in accordance with a reduction speed of a flexible display according to one embodiment.

FIG. 11 is a diagram for showing a device controlling a display of an application execution screen in accordance with a reduction speed of a flexible display according to one embodiment. Similar to the case that the flexible display expands, a display can be controlled according to the speed of reduction in case that the flexible display is reduced.

More specifically, in case that the speed of reduction at a specific unit length (111, 112, and 113) is slower than the designated speed, the application execution screen corresponding to a previous unit length of the specific unit length (111, 112, and 13) may be displayed. For instance, in case that the speed of reduction at the third unit length 113 is faster than the designated speed, the second application execution screen corresponding to the second unit length 112, which is the previous unit length of the third unit length 113, may be displayed. Or, in case that the speed of reduction at the second unit length 112 is faster than the designated speed, the first application execution screen corresponding to the first unit length 111, which is the previous unit length of the second unit length 112, may be displayed. Meanwhile, in case that the reduction speed at the first unit length 111 is faster than the designated speed, no application execution screen may be displayed on the flexible display because the previous unit length of the first unit length 111 does not exist.

On the contrary, in case that the speed of reduction is slower than the designated speed, the application execution screen displayed on the flexible display may be displayed in a manner of being reduced. For instance, in case that the reduction speed at the third unit length 113 is slower than the designated speed, the third application execution screen can be displayed on the flexible display in a manner of being reduced. Or, in case that the reduction speed at the second unit length 112 is slower than the designated speed, the second or the third application execution screen can be displayed in a manner of being reduced. Or, in case that the flexible display is reduced less than the first unit length 111, the first, the second, or the third application execution screen can be displayed in a manner of being reduced.

Meanwhile, in case that the flexible display is reduced to each of the unit lengths (111, 112, and 113), it is based upon the premise that the application corresponding to each of the unit lengths (111, 112, and 113) is executed in the present embodiment similar to the case of expansion. Hence, in case that the flexible display stops reducing for a prescribed time in each of the unit lengths (111, 112 and 113), the application execution screen corresponding to each of the unit lengths (111, 112, and 113) may be displayed.

And, the speed of reduction of the flexible display may be 1) an average speed at a specific length section or 2) an instantaneous speed at a position of which the flexible display is reduced to a specific length. The reduction speed described in the present specification selects the instantaneous speed as a criterion. Yet, the reduction speed of the present specification may be non-limited to the instantaneous speed and may include the average speed at a specific reduction section of the flexible display as well. In case that the average speed is selected as a criteria of the reduction speed, a speed measuring can be performed at plus or minus of a prescribed length from the each of the unit lengths. The reduction speed described in the present specification means an absolute value of the measured speed value. Hence, it is not a vector but a scalar value.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

And, the device and controlling method therefor may not limitedly apply to the composition and method of the aforementioned embodiments. The aforementioned embodiments may be configured in a manner of being selectively combined the whole of the embodiments or a part of the embodiments to achieve various modifications.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

And, it may be considered that a width, a length, and the like described in the present specification may indicate not only a precise width and length but also a practical width and length in a prescribed range. And, the speed measuring at each of the unit lengths can be performed at plus or minus of a prescribed length from the each of the unit lengths. In particular, the unit length of the flexible display may mean a practically expanded length and there may exist an error in a prescribed range.

And, both an apparatus invention and a method invention are explained in the present specification and the explanation on the both of the inventions can be complementally applied, if necessary.

What is claimed is:

1. A device, comprising:
   a flexible display;
   a length measuring sensor configured to measure a length of the flexible display expanded from the device;
   a speed measuring sensor configured to measure a speed at which the flexible display expands from the device; and
   a processor configured to:
   if the flexible display expands from a state of storing in the device to less than a first unit length,
   display a first application execution screen on the flexible display when a first expansion speed is slower than a designated speed, and
   display a second application execution screen on the flexible display when the first expansion speed is faster than the designated speed,
   wherein the first expansion speed is a speed of a beginning moment of expansion when the flexible display expands from a state of storing in the device to less than the first unit length.

2. The device of claim 1, wherein if the flexible display stops expanding for more than a prescribed time in the first unit length, the processor displays the first application execution screen corresponding to the first unit length or wherein if the flexible display stops expanding for more than the prescribed time in the second unit length, the processor displays the second application execution screen corresponding to the second unit length.

3. The device of claim 1, wherein if the flexible display expands more than the first unit length and less than the second unit length, the processor controls the first application execution screen or the second application execution screen according to a second expansion speed of the flexible display.

4. The device of claim 3, wherein if the first application execution screen is displayed on the flexible display, the processor displays an enlarged first application execution screen on the flexible display when the second expansion speed is slower than the designated speed and the processor displays the second application execution screen on the flexible display when the second expansion speed is faster than the designated speed.

5. The device of claim 3, wherein if the flexible display expands more than the second unit length and less than a third unit length, the processor controls the first application execution screen, the second application execution screen or a third application execution screen corresponding to the third unit length according to a third expansion speed of the flexible display.

6. The device of claim 5, wherein if an enlarged first application execution screen is displayed on the flexible display, the processor displays the enlarged first application execution screen on the flexible display when the third expansion speed of the flexible display is slower than the designated speed and the processor displays the third application execution screen on the flexible display when the third expansion speed of the flexible display is faster than the designated speed.

7. The device of claim 5, wherein if the second application execution screen is displayed on the flexible display, the processor displays an enlarged second application execution screen on the flexible display when the third expansion speed is slower than the designated speed and the processor displays the third application execution screen on the flexible display when the third expansion speed is faster than the designated speed.

8. The device of claim 1, wherein the flexible display comprises a touch sensor capable of sensing a touch input.

9. A method of controlling a device containing a main display, a flexible display, and a housing unit for storing the flexible display, the method comprising:
   expanding the flexible display from a state of storing in the device to less than a first unit length;
   measuring a first expansion speed of the flexible display;
   displaying a first application execution screen on the flexible display when the first expansion speed is slower than a designated speed; and
   displaying a second application execution screen on the flexible display when the first expansion speed is faster than the designated speed,
   wherein the first expansion speed is a speed of a beginning moment of expansion when the flexible display expands from a state of storing in the device to less than the first unit length.

10. The method of claim 9, wherein the method further comprises, if the flexible display expands to the first unit length and stops expanding for more than a prescribed time, displaying the first application execution screen corresponding to the first unit length or if the flexible display stops expanding for more than the prescribed time in the second unit length, displaying the second application execution screen corresponding to the second unit length.

11. The method of claim 9, wherein the method further comprises, if the flexible display expands more than the first unit length and less than the second unit length, controlling the first application execution screen or the second application execution screen according to the second expansion speed of the flexible display.

12. The method of claim 11, wherein the method further comprises, if an enlarged first application execution screen is displayed on the flexible display, displaying the first application execution screen on the flexible display when the second expansion speed is slower than the designated speed and displaying the second application execution screen on the flexible when the second expansion speed is faster than the designated speed.

13. The method of claim 11, wherein the method further comprises, if the flexible display expands more than the second unit length and less than a third unit length, controlling the first application execution screen, the second application execution screen or a third application execution screen corresponding to the third unit length according to a third expansion speed of the flexible display.

14. The method of claim 13, wherein the method further comprises, if an enlarged first application execution screen is displayed on the flexible display, displaying the enlarged first application execution screen when the third expansion speed is slower than the designated speed and displaying the third application execution screen when the third expansion speed is faster than the designated speed.

15. The method of claim 13, wherein the method further comprises, if the second application execution screen is displayed on the flexible display, displaying an enlarged second application execution screen when the third expansion speed is slower than the designated speed and displaying the third application execution when the third expansion speed is faster than the designated speed.

* * * * *